United States Patent
Kim et al.

(10) Patent No.: US 9,761,050 B2
(45) Date of Patent: Sep. 12, 2017

(54) INFORMATION PROVISION DEVICE FOR GLASSES-TYPE TERMINAL AND INFORMATION PROVISION METHOD

(71) Applicant: LG ELECTRONICS INC., Seoul (KR)

(72) Inventors: Sunryang Kim, Seoul (KR); Jinsung Im, Seoul (KR); Jongpil Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/336,805

(22) Filed: Jul. 21, 2014

(65) Prior Publication Data

US 2015/0042543 A1 Feb. 12, 2015

(30) Foreign Application Priority Data

Aug. 9, 2013 (KR) .................. 10-2013-0094949

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06K 9/22* (2013.01);
(Continued)

(58) Field of Classification Search
None
See application file for complete search history.

(56) References Cited

U.S. PATENT DOCUMENTS 8,190,195 B2    5/2012  Busch
2005/0264650 A1* 12/2005 Park ................ H04N 1/3876
                                                  348/36
(Continued)

FOREIGN PATENT DOCUMENTS

CN    101013507    8/2007
CN    102172014    8/2011
(Continued)

OTHER PUBLICATIONS

European Patent Office Application Serial No. 14002580.0, Search Report dated Jan. 28, 2015, 8 pages.
(Continued)

*Primary Examiner* — Alexander Eisen
*Assistant Examiner* — Kebede Teshome
(74) *Attorney, Agent, or Firm* — Lee, Hong, Degerman, Kang & Waimey PC

(57) ABSTRACT

Provided is an information provision device for a glasses-type terminal, including: a camera; and a controller that is configured to detect a first object from an image that is captured through the camera, to recognize information that is indicated on the detected first object, to recognize a second object associated with the recognized information from the image that is captured through the camera for a predetermined first time starting from a point in time at which the first object is detected, and to store the recognized second object in a storage unit along with the recognized information.

17 Claims, 13 Drawing Sheets

(51) Int. Cl.
*H04N 5/232* (2006.01)
*G06K 9/22* (2006.01)

(52) U.S. Cl.
CPC ... *H04N 5/23229* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2008/0029608 A1* | 2/2008 | Kellum | G06K 19/07354 235/492 |
| 2010/0231733 A1 | 9/2010 | Dobashi et al. | |
| 2011/0077048 A1* | 3/2011 | Busch | G06K 9/2054 455/556.1 |
| 2011/0199505 A1* | 8/2011 | Teranishi | H04N 5/232 348/222.1 |
| 2013/0049976 A1* | 2/2013 | Maggiore | G06T 19/006 340/686.1 |
| 2013/0142387 A1* | 6/2013 | Gomez | G02B 27/017 382/103 |
| 2013/0169536 A1 | 7/2013 | Wexler et al. | |

FOREIGN PATENT DOCUMENTS

| | | |
|---|---|---|
| CN | 102238282 | 11/2011 |
| CN | 102457617 | 5/2012 |
| WO | 2013/049248 | 4/2013 |

OTHER PUBLICATIONS

The State Intellectual Property Office of the People's Republic of China Application Serial No. 201410392286.2, Office Action dated Jan. 20, 2016, 19 pages.

* cited by examiner

INFORMATION PROVISION DEVICE FOR GLASSES-TYPE TERMINAL AND INFORMATION PROVISION METHOD

CROSS-REFERENCE TO RELATED APPLICATION

Pursuant to 35 U.S.C. §119(a), this application claims the benefit of earlier filing date and right of priority to Korean Application No. 10-2013-0094949, filed on Aug. 9, 2013, the contents of which is incorporated by reference herein in its entirety.

BACKGROUND OF THE DISCLOSURE

1. Field of the Disclosure

The present disclosure relates to an information provision device for a glasses-type terminal and an information provision method for use in the glasses-type terminal.

2. Background of the Disclosure

With the technical advances in the information age, particular emphasis is made on the importance of a display device realizing a reality-enhanced screen. A head-mounted display is one example of such devices. The head-mounted display, mainly in the form of safety glasses or a helmet, is a display device that has a small display optic in front of each eye. The head-mounted display has been developed to realize a virtual reality. Generally, a wearable glasses-type terminal has a small-sized liquid crystal display installed proximately in front of both eyes and has the capability of reflecting projected images. Currently, research has been ongoing towards developments of the wearable glasses-type terminals for use in a space development, a nuclear reactor, a military institution, and for use in a business and a computer game.

SUMMARY OF THE DISCLOSURE

Therefore, an aspect of the detailed description is to provide an information provision device for a glasses-type terminal.

Another of the detailed description is to an information provision method for use in the glasses-type terminal.

To achieve these and other advantages and in accordance with the purpose of this specification, as embodied and broadly described herein, there is provided an information provision device for a glasses-type terminal and an information provision method for use in the glasses-type terminal.

According to an aspect of the present invention, there is provided an information provision device for a glasses-type terminal, including: a camera; and a controller that is configured to detect a first object from an image that is captured through the camera, to recognize information that is indicated on the detected first object, to recognize a second object associated with the recognized information from the image that is captured through the camera for a predetermined first time starting from a point in time at which the first object is detected, and to store the recognized second object in a storage unit along with the recognized information.

In the information provision device, when the glasses-type terminal is in an object recognition mode, the controller may control the camera in such a manner that the camera photographs the image in real time.

In the information provision device, the first object may be any one of a business card, a building, and a product.

In the information provision device, the controller may automatically activate the object recognition mode when an object that is registered in advance is recognized through the camera, may activate the object recognition mode when a schedule is searched for through a schedule management program and as a result of searching for the schedule, it is found that a predetermined schedule will occur after a predetermined time elapses, may automatically activates the object recognition mode when a predetermined voice is recognized, or may activate the object recognition mode when the object recognition mode is selected from a menu on the display unit.

In the information provision device, the controller may compare the recognized information with an object list that is stored in advance in the storage unit, and when as a result of the comparison, the recognized information is not present on the object list that is stored in advance, the controller may append the recognized information to the object list that is stored in advance.

In the information provision device, when as the result of the comparison, the recognized information is present on the object list that is stored in advance, the controller may automatically delete the recognized information and at the same time, may display alerting information that alerts a user that the recognized information is present on the object list that is stored in advance, on the display unit.

In the information provision device, along with the recognized information, the controller may store in the storage unit information on a date on which the information indicated on the first object is recognized and information on a place at which the information indicated on the first object is recognized.

In the information provision device, along with the recognized information, the controller may store in the storage unit information on a date on which the information indicated on the first object is recognized and information on a place at which the information indicated on the first object is recognized, and voices that are generated during a period of time from a point in time at which the first object is detected to a point in time at which the first object is stored.

In the information provision device, the controller may recognize the second object from the image that is captured through the camera for the predetermined first time starting from a point in time at which the first object is detected, and when the recognized second object is one, may store the one second object and the recognized information as object information.

In the information provision device, when the multiple second objects are recognized from the image that is captured through the camera for the predetermined first time starting from the point in time at which the first object is detected, along with the recognized information, the controller may store in the storage unit any one object that is selected from among the multiple second objects.

In the information provision device, when the second object is not recognized from the image that is captured through the camera for the predetermined first time starting from the point in time at which the first object is detected, the controller may generate instruction information that instructs the user to photograph the second object corresponding to the recognized information, and displays the generated instruction information on the display unit.

In the information provision device, the controller may automatically photograph a photographic subject for a predetermined second time starting from a point in time at which the instruction information is displayed on the display unit, and may recognize the second object from the photographic subject that is photographed for the predetermined second time.

To achieve these and other advantages and in accordance with the purpose of this specification, as embodied and broadly described herein, there is provided an information provision method for use in a glasses-type terminal, including: detecting a first object from an image that is captured through a camera; recognizing information that is indicated on the detected first object; recognizing a second object associated with the recognized information from the image that is captured through the camera for a predetermined first time starting from a point in time at which the first object is detected; and storing the recognized second object in a storage unit along with the recognized information.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Figure 1:
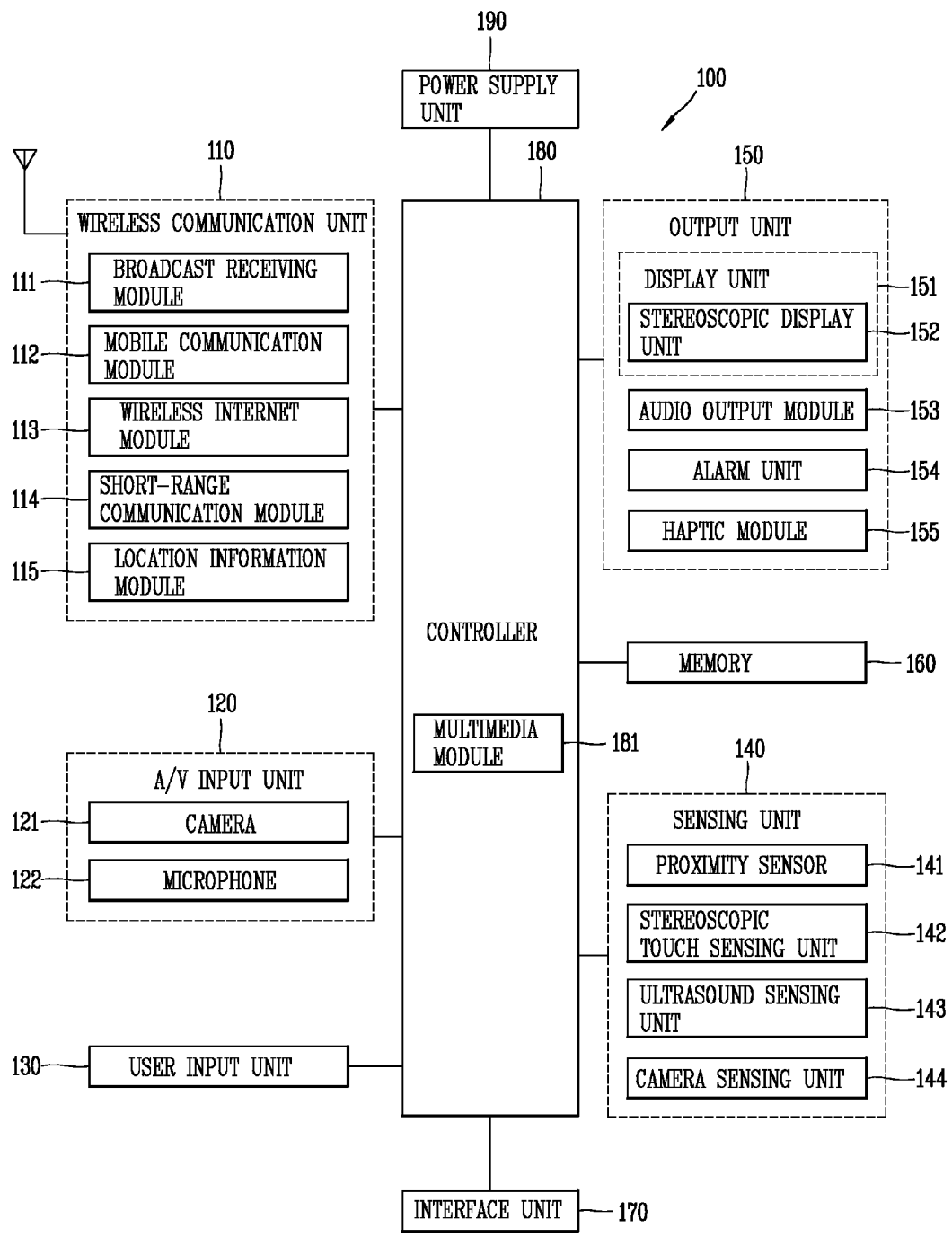
FIG. 1 is a block diagram illustrating a wearable glasses-type terminal according to one embodiment of the present invention, which is disclosed in the present specification.

FIG. 1 is a block diagram of a wearable glasses-type terminal 100 in accordance with one exemplary embodiment.

The wearable glasses-type terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the wearable glasses-type terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the wearable glasses-type terminal 100 and a wireless communication system or between the wearable glasses-type terminal 100 and a network within which the wearable glasses-type terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the wearable glasses-type terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the wearable glasses-type terminal 100, a presence or absence of user contact with the wearable glasses-type terminal 100, the location of the wearable glasses-type terminal 100, acceleration/deceleration of the wearable glasses-type terminal 100, and the like, so as to generate a sensing signal for controlling the operation of the wearable glasses-type terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the wearable glasses-type terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the wearable glasses-type terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the wearable glasses-type terminal 100 (e.g., a call signal reception sound, a message reception sound, etc.). The audio output module 153 may include a speaker, a buzzer or the like.

The alarm unit 154 outputs a signal for informing about an occurrence of an event of the wearable glasses-type terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the wearable glasses-type terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the wearable glasses-type terminal 100 may be operated in relation to a web storage device that performs the storage function of the memory 160 over the Internet.

The interface unit 170 serves as an interface with every external device connected with the wearable glasses-type terminal 100. For example, the external devices may transmit data to an external device, receives and transmits power to each element of the wearable glasses-type terminal 100, or transmits internal data of the wearable glasses-type terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the wearable glasses-type terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the wearable glasses-type terminal 100 is connected with an external cradle, the interface unit 170 may serve as a passage to allow power from the cradle to be supplied therethrough to the wearable glasses-type terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the wearable glasses-type terminal 100 according to the present disclosure will be described.

Figure 2A:
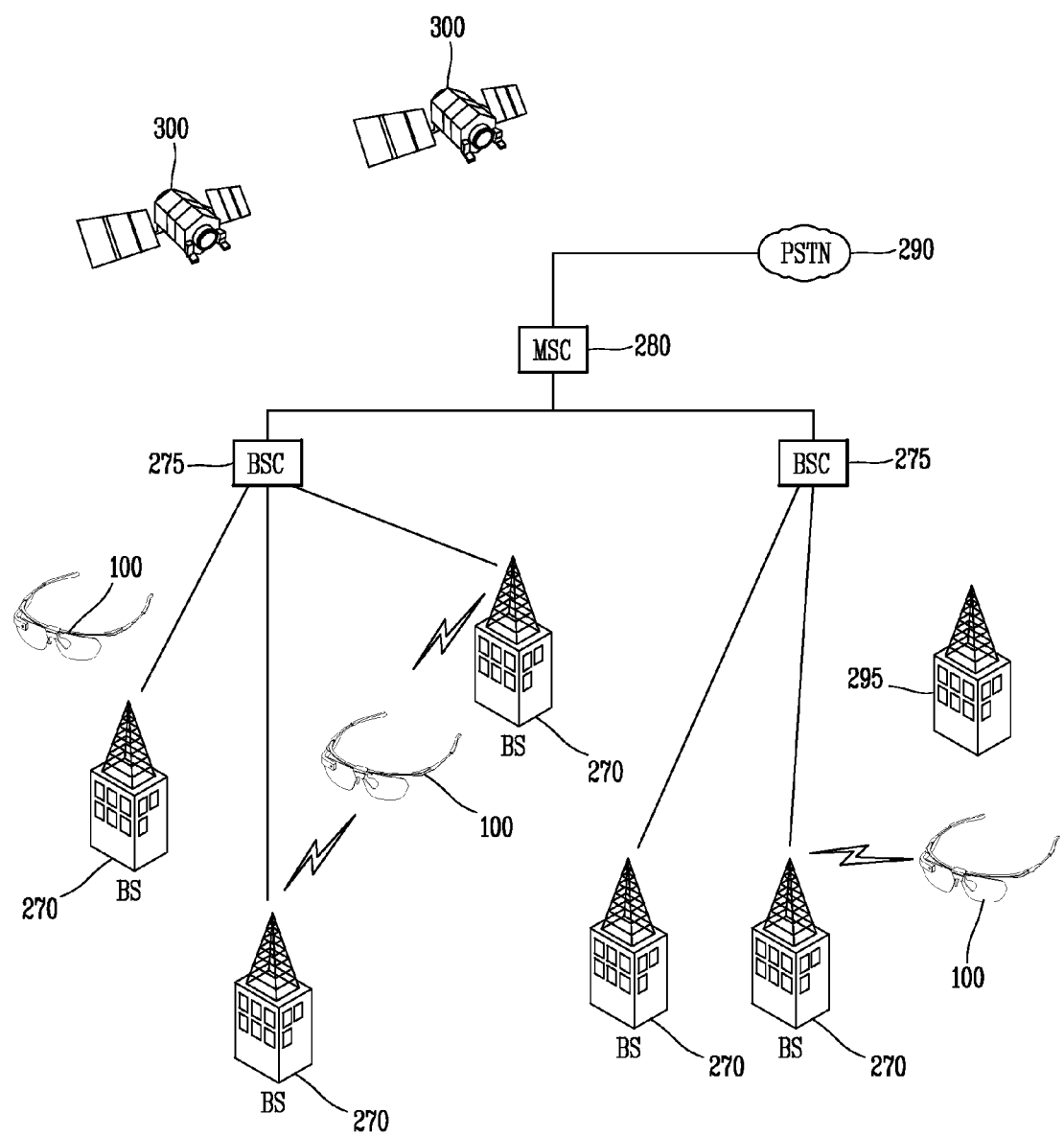
FIGS. 2A and 2B are diagrams, each schematically illustrating a communication system in which the wearable glasses-type terminal according to the present invention operates.
Figure 2B:
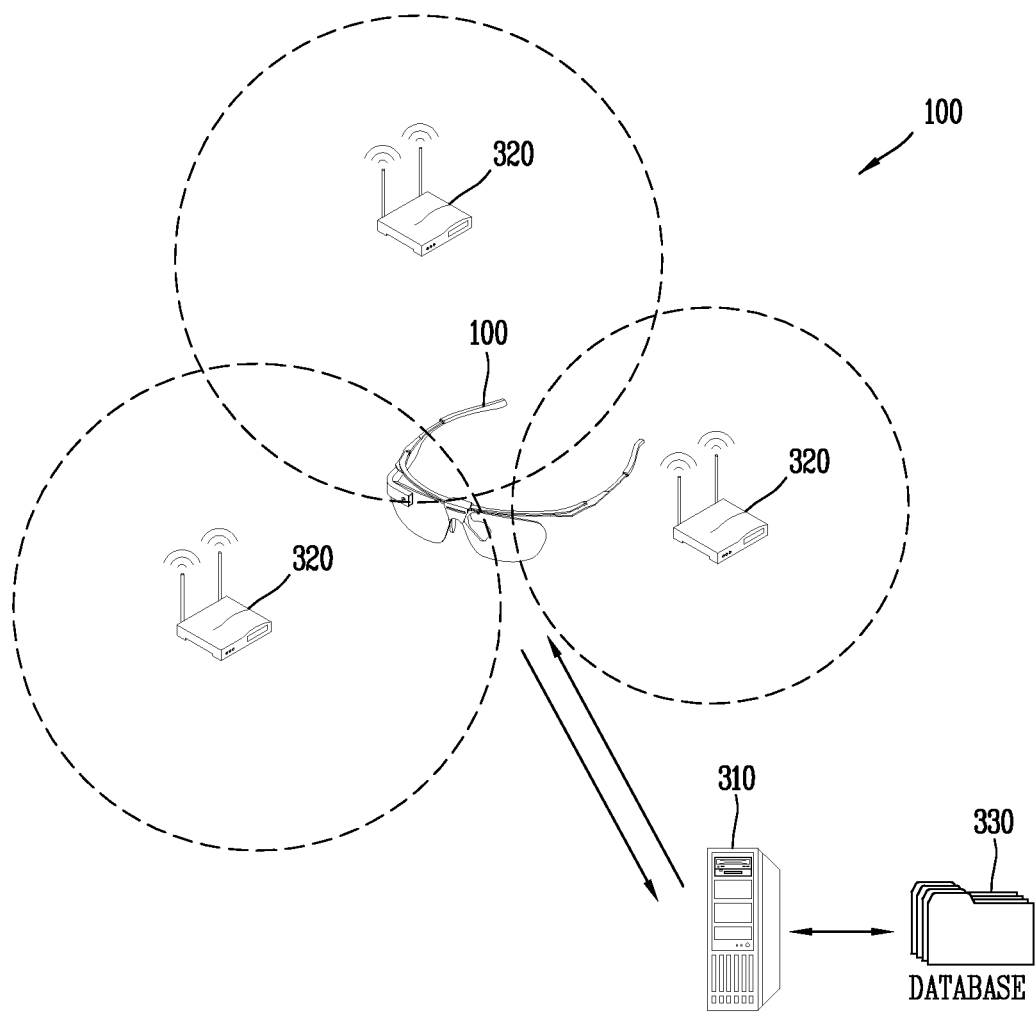

FIGS. 2A and 2B are conceptual views of a communication system operable with a wearable glasses-type terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the wearable glasses-type terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the wearable glasses-type terminal 100 using a WiFi module provided in the wearable glasses-type terminal 100 and a wireless access point 320 for transmitting and receiving to and from the WiFi module.

The WiFi positioning system 300 may include a WiFi location determination server 310, a wearable glasses-type terminal 100, a wireless access point (AP) 320 connected to the wearable glasses-type terminal 100, and a database 330 stored with any wireless AP information.

The WiFi location determination server 310 extracts the information of the wireless AP 320 connected to the wearable glasses-type terminal 100 based on a location information request message (or signal) of the wearable glasses-type terminal 100. The information of the wireless AP 320 may be transmitted to the WiFi location determination server 310 through the wearable glasses-type terminal 100 or transmitted to the WiFi location determination server 310 from the wireless AP 320.

The information of the wireless AP extracted based on the location information request message of the wearable glasses-type terminal 100 may be at least one of MAC address, SSID, RSSI, channel information, privacy, network type, signal strength and noise strength.

The WiFi location determination server 310 receives the information of the wireless AP 320 connected to the wearable glasses-type terminal 100 as described above, and compares the received wireless AP 320 information with information contained in the pre-established database 330 to extract (or analyze) the location information of the wearable glasses-type terminal 100.

On the other hand, referring to FIG. 2B, as an example, the wireless AP connected to the wearable glasses-type terminal 100 is illustrated as a first, a second, and a third wireless AP 320. However, the number of wireless APs connected to the wearable glasses-type terminal 100 may be changed in various ways according to a wireless communication environment in which the wearable glasses-type terminal 100 is located. When the wearable glasses-type terminal 100 is connected to at least one of wireless APs, the WiFi positioning system 300 can track the location of the wearable glasses-type terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the wearable glasses-type terminal 100 from the database 330 to extract the location information matched to the searched wireless AP, thereby extracting the location information of the wearable glasses-type terminal 100.

The constituent elements of a wearable glasses-type terminal 100 according to one embodiment of the present invention, which are illustrated in FIG. 1, or constituent elements of a wearable glasses-type terminal 100 are described below in terms of arrangement and configuration.

Figure 3:
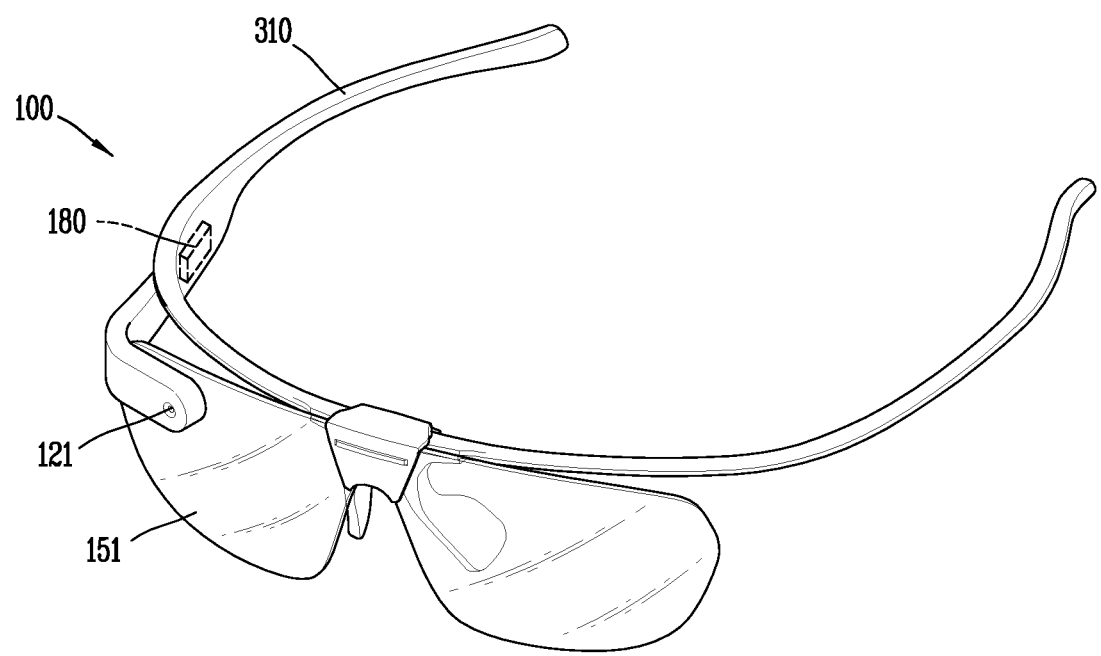
FIG. 3 is a diagram illustrating the wearable glasses-type terminal 100.

FIG. 3 is a diagram illustrating the wearable glasses-type terminal 100 according to the present invention.

Referring to FIG. 3, the wearable glasses-type terminal 100 according to FIG. 3 includes a main body 310, a display unit 151, and a controller 180.

In addition, the wearable glasses-type terminal 100 according to the present invention may further include a user input unit, a voice recognition unit, and a motion detection unit.

The wearable glasses-type terminal 100 according to the present invention is realized as a head-mounted display. As a specific embodiment, the wearable glasses-type terminal 100 may be realized as smart glasses.

The main body 310 is formed in such a manner that it is mountable on the head. For example, the main body 310 is realized as frames and temples of the smart glasses and.

The display units 151, coupled with the main body 310, are arranged in positions that correspond to both eyes, respectively. In addition, the display unit 151 has optical transparency, and visual information is output to the display unit 151.

The visual information means a virtual object that is generated from the wearable glasses-type terminal 100 or is input from an external device. For example, the virtual object means an application, an icon corresponding to the application, content, or a user interface (UI) such as a voice communication call mode. The virtual object is generated by the controller 180 or is input from a mobile terminal such as a smart phone. At this point, since the display unit 151 has the optical transparency, the user can view an external environment through the display unit 151.

In addition, as one embodiment, the external environment may be viewed through the display unit 151 and at the same time, information on arbitrary external object that makes up the external environment may be output to the display unit 151. For example, the external object is a business card, a human being, or an external device with which mutual communication is possible.

As described above, the controller 180 controls the wearable glasses-type terminal 100. Specifically, the controller 180 outputs information on the external device, which is detected in a wireless communication unit 110, to the display unit 151.

For example, the controller 180 identifies a position of the detected external device. At this point, the controller 180 determined whether or not the detected external device is positioned with a user's sight and based on a result of this determination, determines whether or not the information on the detected external device is output.

In addition, the controller 180 is mounted on the main body 310 of the wearable glasses-type terminal 100 or the controller 180 and the main body 310 are integrally formed into one piece. A controller 180 according to another embodiment may be arranged separately from the main body 310.

A camera 121 is arranged on the front side of at least one of the left and right display units 151. Alternately, the camera 121 is arranged on one or both of the frames 310 and photographs an object that is out of the wearer's sight.

The user input unit 130 is realized as a separate touch panel that is provided on one or both of the frames 310. Alternately, the user input unit 130 may be realized as a physical key. For example, an ON/OFF switch of a power source is realized in such a manner that it is provided on one of the frames 310.

A user input 130 according to another embodiment may be realized as a separate external device that is connected to the main body 310. Accordingly, the user can input a specific command into the separate external device. Alternatively, the display unit 151 is realized as a touch screen, and thus the user can input a control command directly into the display unit 151.

A user input unit 130 according to another embodiment may be realized as a module that recognizes a voice command. Accordingly, the user can input a specific voice command into the main body 310.

On the other hand, smart glasses according to one embodiment of the wearable glasses-type terminal are introduced to the market. The smart glasses realized as the wearable device conveniently performs a function that is performed on the existing mobile terminal.

The visual information that is output along with the external environment that is viewed through the display unit 151 is displayed together on the display unit 151 of the smart glasses (this is referred to as an augmented reality). Accordingly, the user can more easily grasp the information on the arbitrary object that makes up the external environment.

In addition, the smart glasses perform wireless communication with other smart glasses or with the external device with which the communication is possible. At this point, information relating to the external device is output to the display unit 151.

Figure 4:
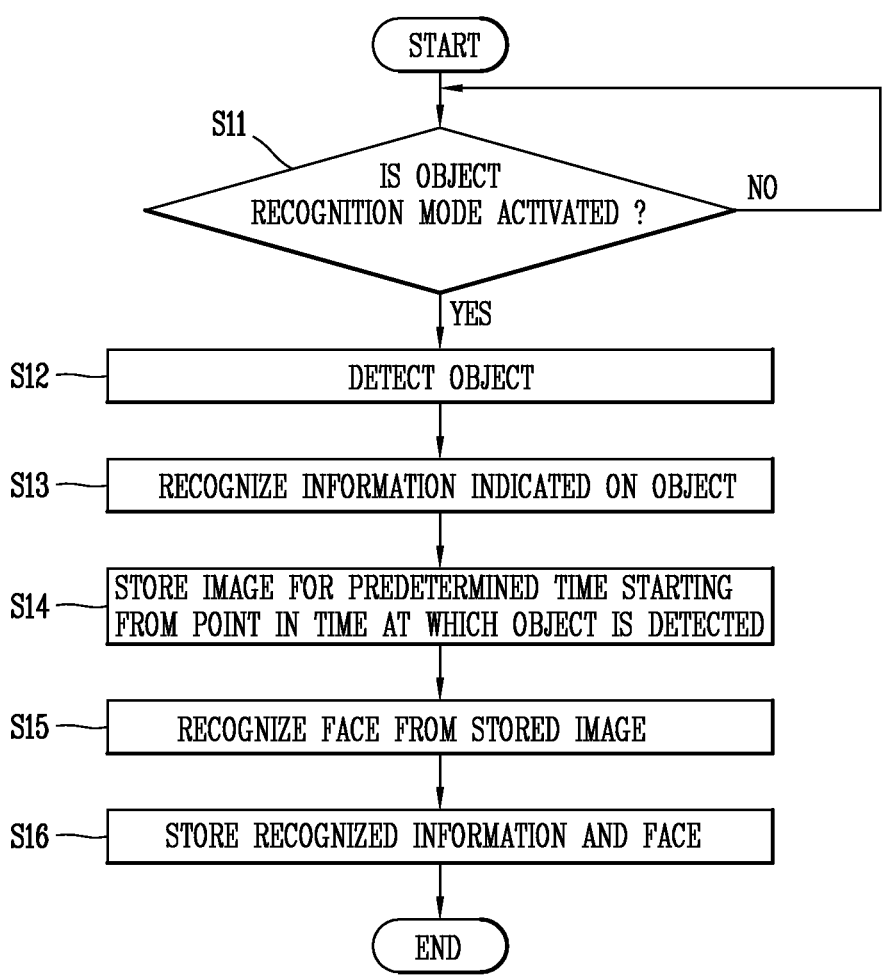
FIG. 4 is a flow chart illustrating an information provision method for use in the glasses-type terminal, according to a first embodiment of the present invention.

FIG. 4 is a flow chart illustrating an information provision method for use in the glasses-type terminal, according to a first embodiment of the present invention.

First, the controller 180 determined whether or not an object recognition mode (for example, a mode in which a business card, a building, a thing (a product), and the like) is activated (S11). For example, when a business card of the user (the user's own) that is registered in advance is recognized through the camera 121, the controller 180 automatically activates the object recognition mode (for example, a business card mode). The controller 180 periodically searches for a schedule through a schedule management program. When as a result of searching for the schedule, it is found that a predetermined schedule will occur after a predetermined time (for example, 10 to 20 minutes) elapses (for example, 20 minutes before an appointment), the controller 180 may automatically activate the object recognition mode. When a predetermined voice (for example, "business card recognition," "building recognition," "product recognition," and the like) is recognized, the controller 180 may activate the object recognition mode. When the object recognition mode is selected by the user from a menu on the display unit 151, the controller 180 may activate the object recognition mode.

When the object recognition mode is activated, the controller 180 controls the camera 121 in such a manner that the camera 121 photographs a photographic subject in real time and detects a predetermined object from the photographed photographic subject (S12). For example, when the business card mode is activated, the controller 180 detects an object (for example, a business card) in real time through an object recognition program from an image that is captured in real time through the camera 121. The controller 180 may recognize the business card, based on a type of business card and a text (for example, a name, a telephone number, an address, or the like), which are predetermined, within the image that is captured in real time through the camera 121. On the other hand, when the business card is not detected from the captured image of the photographic subject for a predetermined time (for example, 10 to 20 seconds), the controller 180 may terminate the business card mode and the same time display on the display unit 151 information indicating that the business card is not detected.

An information provision apparatus for the glasses-type terminal, according to embodiments of the present invention, and an information provision method for use in the glasses-type terminal can detect not only the business card, but also various objects, such as a building and a product (a thing) which include information.

Figure 5:
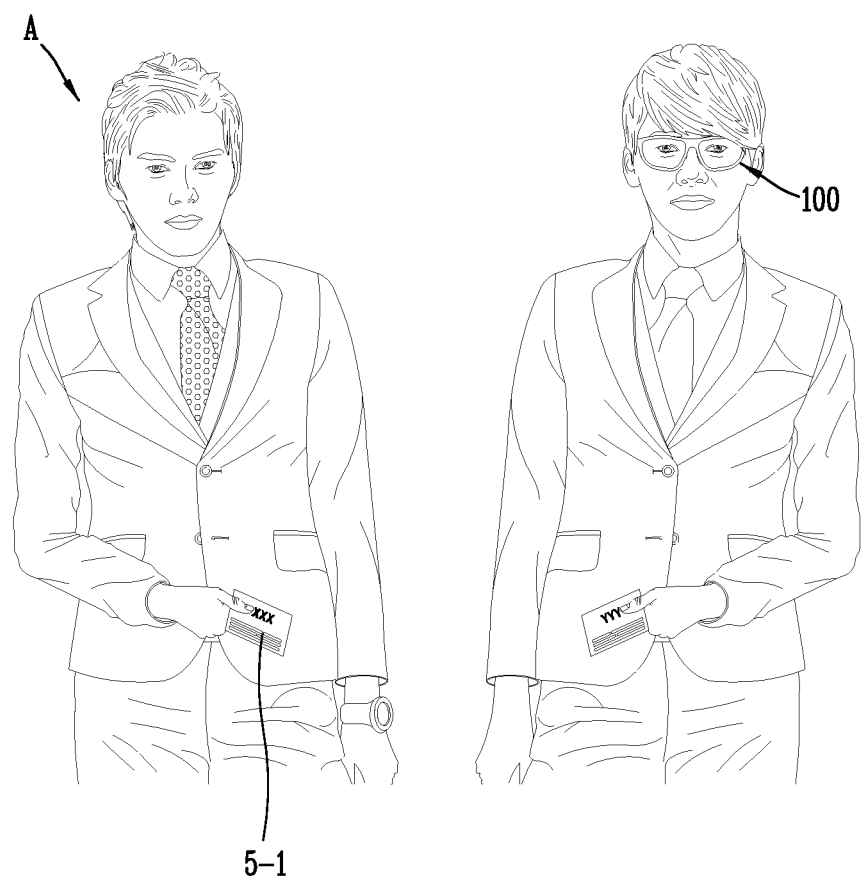
FIG. 5 is a diagram illustrating a business card detection process according to the first embodiment of the present invention.

FIG. 5 is a diagram illustrating a business card detection process according to the first embodiment of the present.

As illustrated in FIG. 5, the user receives a business card 5-1 from someone A at a conference or a social gathering. At this point, when the business card mode is activated, the controller 180 detects his/her business card 5-1 in real time through the camera 121.

Figure 6:
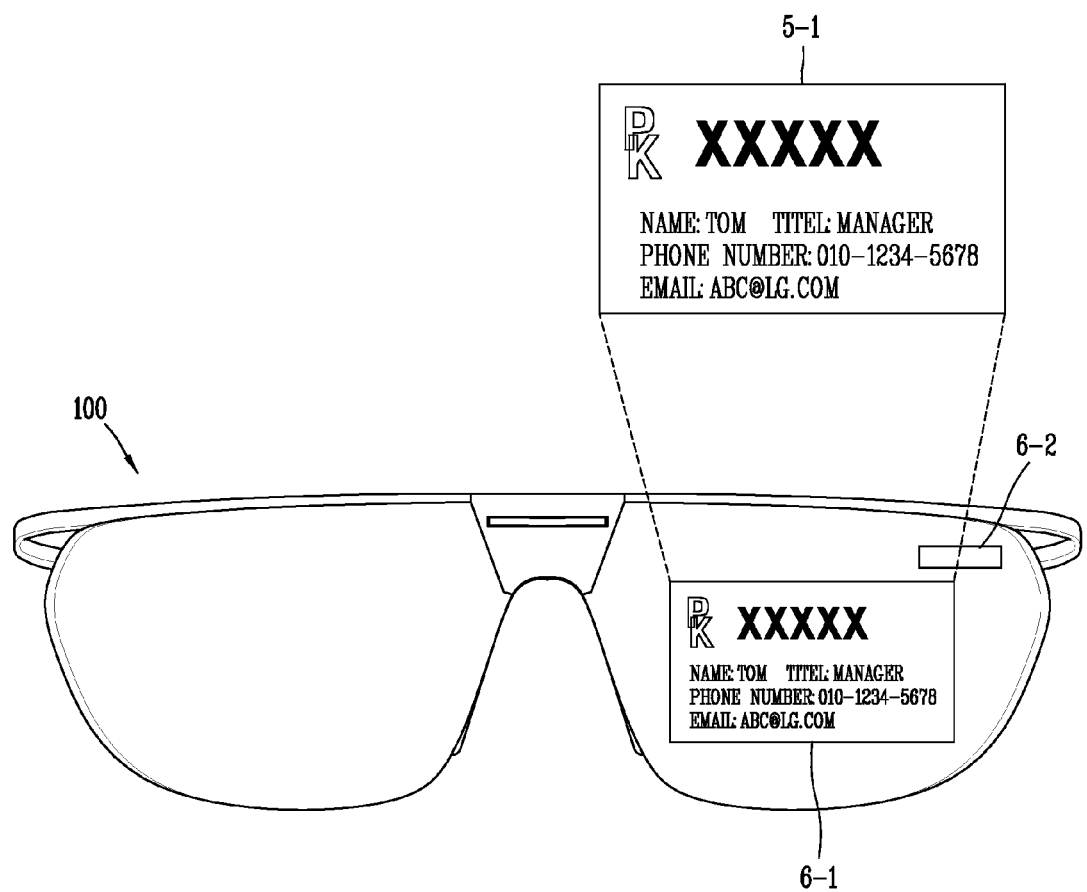
FIG. 6 is a diagram illustrating a process of recognizing an object according to the first embodiment of the present invention.

FIG. 6 is a diagram illustrating a process of recognizing an object (for example, a business card) according to the first embodiment of the present invention.

As illustrated in FIG. 6, when the business card 5-1 is detected through the camera 121, the controller 180 recognizes information that is described on the detected business card (the object) 5-1 (S13), and displays the recognized information (business card information, or object information) 6-1 on the display unit 151 for a predetermined time (for example, 3 seconds). The predetermined time (for example, 3 seconds) may be changed by the user.

When the object recognition mode is activated, the controller 180 may display information (for example, an icon, an image, or the like) 6-2, which indicates that the object recognition mode is being activated, on the display unit 151. When the object recognition mode is activated, the controller 180 alert the user to the information indicating that the object recognition mode is being activated, through a pop-up window (a voice, an optical signal, or the like).

When the object (for example, a business card, a building, a product, or the like) 5-1 is detected through the camera 121, the controller 180 stores in the storage unit (the memory) 160 an image that is captured through the camera 121 for a predetermined time (for example, 10 seconds) starting from a starting point in time at which the object (the business card, the building, the product, or the like) 5-1 is detected (S14). When the object (for example, the business card, the building, the product, or the like) 5-1 is detected through the camera 121, the controller 180 may store in the storage unit (the memory) 160 the image that is captured through the camera 121 for 10 seconds (a predetermined time) before the starting point in time at which the object (the business card, the building, the product, or the like) 5-1 is detected, and for 10 seconds (a predetermined time) after the starting point in time at which the object (the business card, the building, the product, or the like) 5-1 is detected. The predetermined time (for example, 10 seconds) may be changed by the user.

The controller 180 displays the recognized information 6-1 on the display unit 151 for a predetermined time (for example, 3 to 5 seconds) and then stores the recognized information in the storage unit (the memory) 160.

The controller 180 compares the recognized information 6-1 with a business card list that is stored in advance in the storage unit (the memory) 160, and when as a result of the comparison, the recognized information 6-1 is not present on the business card list that is stored in advance, may append the recognized information 6-1 to the business card list in the storage unit (the memory) 160. On the other hand, the controller 180 may compare the recognized information 6-1 with the business card list that is stored in advance in the storage unit (the memory) 160, and when as the result of the comparison, the recognized information 6-1 is present on the business card list that is stored in advance, may automatically delete the recognized information 6-1 and at the same time may display on the display unit 151 the alerting information that alerts the user that the recognized information 6-1 is present on the business card list that is stored in advance.

When storing the recognized information (the business card) 6-1 in the storage unit (the memory) 160, the controller 180 may store together in the storage unit 160 information on a date on which the business card 6-1 is recognized and information on a place at which the business card 6-1 is recognized. When storing the recognized information (the business card) 6-1 in the storage unit (the memory) 160, along with the information on a date on which the business card 6-1 is recognized and the information on a place at which the business card 6-1 is recognized, the controller 180 may store in the storage unit 160 voices (for example, a voice of the user and a voice of someone A) that are generated during a period of time from a point in time at which the business card 6-1 is detected to a point in time at which the business card 6-1 is stored. For example, along with the recognized information 6-1, the controller 180 may store in the storage unit 160 a moving image that is captured through the camera and/or voices that are received through the microphone 122, during a period of time from the point in time at which the object (for example, the business card, the building, the product, or the like) is detected to the point in time at which the object is stored.

The controller 180 recognizes through a face recognition program the face of someone A from the image that is stored in the storage unit (the memory) 160 for a predetermined time (for example, 10 seconds) starting from a point in time at which the business card 6-1 is detected (S15), and along with the recognized information (the business card), stores the recognized face in the storage unit 160 (S16).

Figure 7:
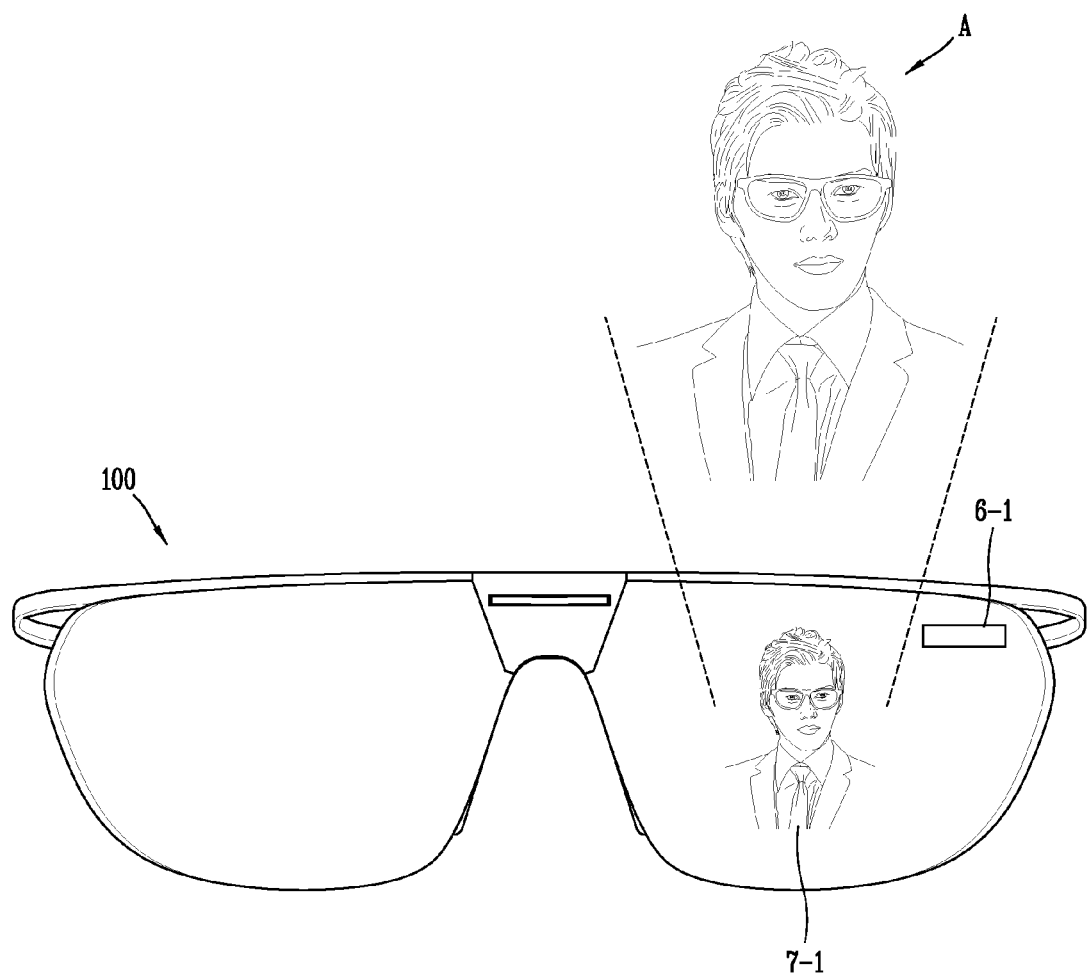
FIG. 7 is a diagram illustrating a process of recognizing a face according to the first embodiment of the present invention.

FIG. 7 is a diagram illustrating a process of recognizing a face according to the first embodiment of the present invention.

As illustrated in FIG. 7, the controller 180 recognizes the face of someone A, through the face recognition program, from the image that is stored in the storage unit (the memory) 160 for a predetermined time (for example, 10 seconds) starting from the point in time at which the business card 6-1 is detected, and along with the recognized information (the business card) 6-1, stores the recognized face 7-1 in the storage unit 160. For example, when a one face is recognized, through the face recognition program, from the image that is stored in the storage unit (the memory) 160 for a predetermined time (for example, 10 seconds) starting from the point in time at which the business card 6-1 is detected, the controller 180 recognizes one such face as the face of someone A, and along with the recognized information (the business card) 6-1, stores the recognized face 7-1 in the storage unit 160.

After storing the recognized face 7-1 in the storage unit 160, along with the recognized information (the business card) 6-1, the controller 180 may display on the display unit 151 information that alerts the user that the recognized business card 6-1 and the recognized face 7-1 of someone A are stored.

Figure 8:
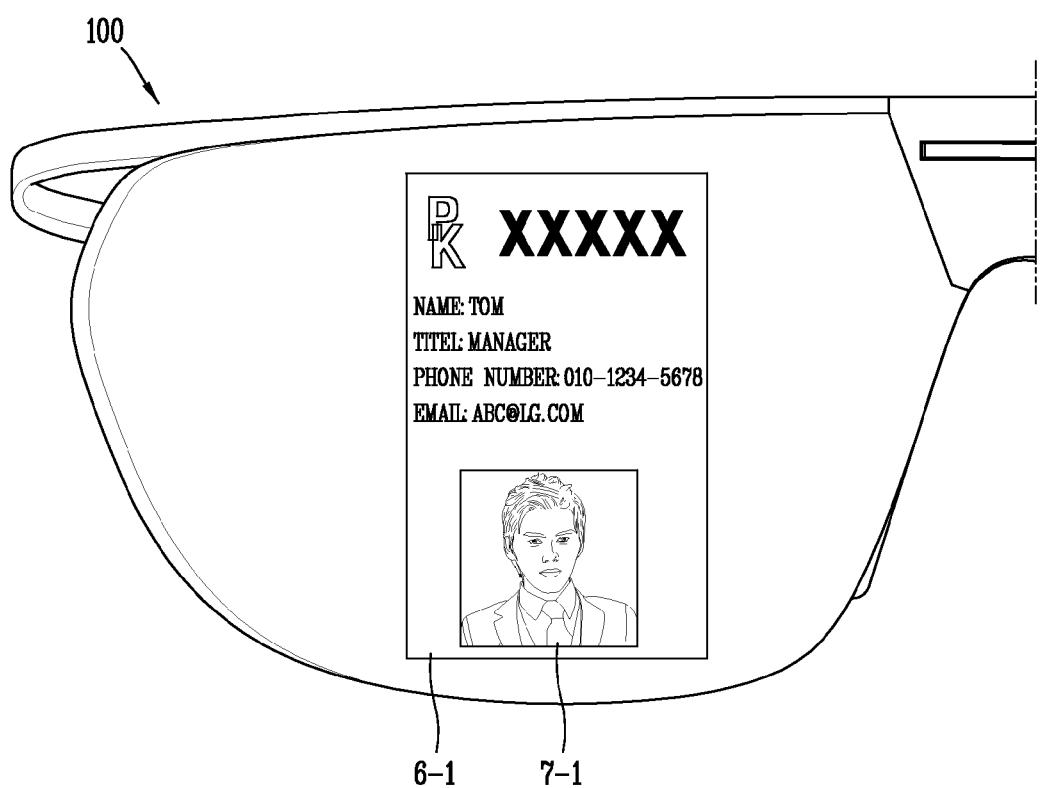
FIG. 8 is a diagram illustrating the stored business card that is stored according to the first embodiment of the present invention.

FIG. 8 is a diagram illustrating the stored business card that is stored according to the first embodiment of the present invention.

As illustrated in FIG. 8, after storing the recognized face 7-1 in the storage unit 160, along with the recognized information (the business card) 6-1, the controller 180 displays on the display unit 151 for a determined time (for example, 3 seconds) the information that alerts the user that the recognized business card 6-1 and the recognized face 7-1 of someone A are stored. The predetermined time (for example, 3 seconds) may be changed by the user.

The controller 180 may detect and recognize not only the business card, but also various objects, such as a building and a product (a thing), each of which includes information. For example, when the object recognition mode is activated, the controller 180 controls the camera 121 in such a manner that the camera 121 photographs a photographic subject in real time, and detects an image of a building from the captured image of the photographic subject and stores the detected image of the building. Thus, the controller 180 may detect information (for example, signboard information (for example, a name of the building) corresponding to the building), a telephone number corresponding to the building, and the like) and may store the detected information). When the object recognition mode is activated, the controller 180 controls the camera 121 in such a manner that the camera 121 photographs a photographic subject in real time, and detects an image of a product (a thing) from the captured image of the photographic subject and stores the detected image of the building. Thus, the controller 180 may detect information (for example, a bar code indicated on the product, a manufacturer indicated on the product, a price indicated on the product, and the like) indicated on the product and may store the detected information.

Therefore, the information provision device for the glasses-type terminal, according to the first embodiment of the present invention, and the information provision method for use in the glasses-type terminal can not only activate the object recognition mode easily, speedily, but also register (store) an object and information corresponding to the object easily, speedily.

Figure 9:
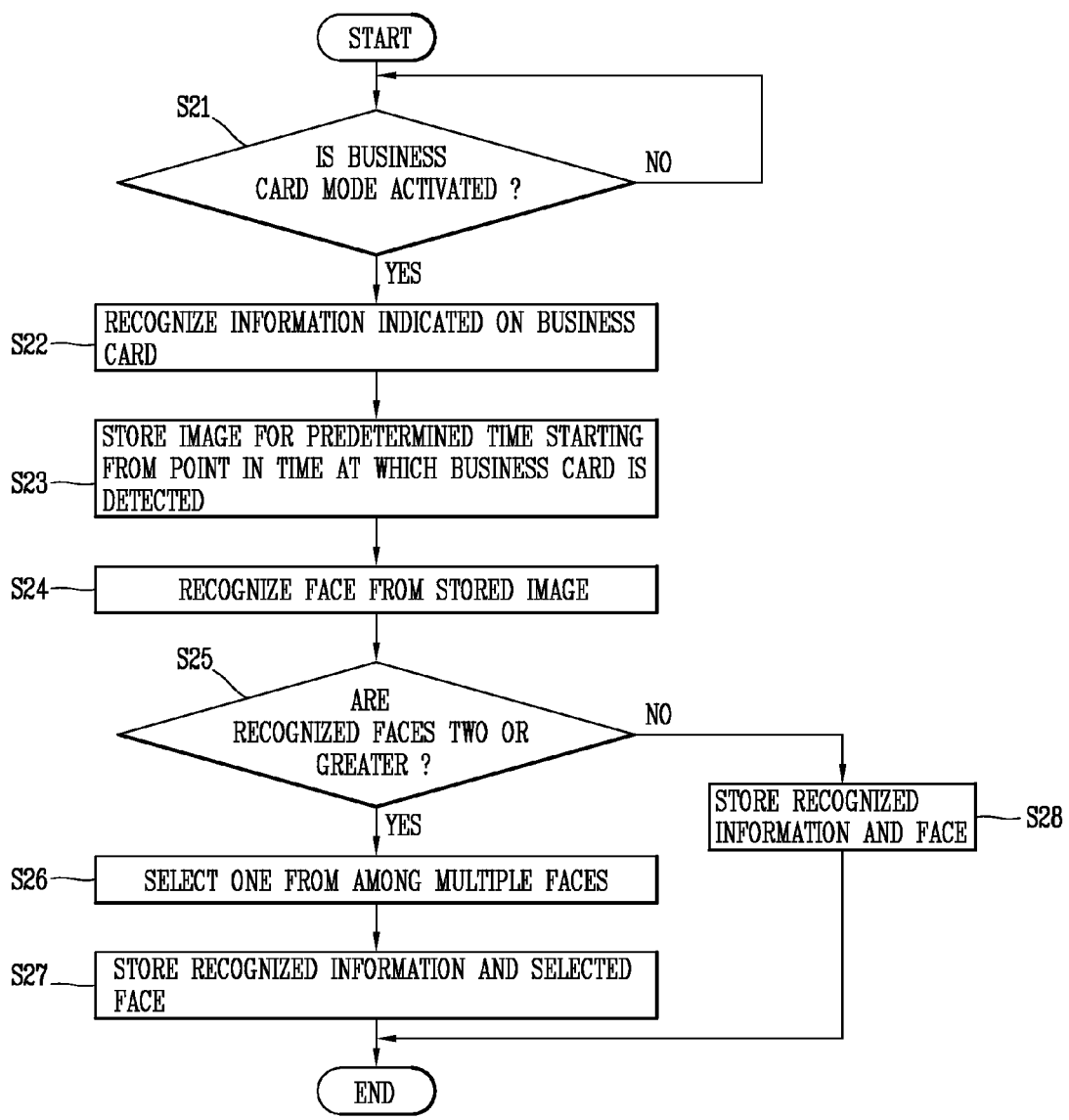
FIG. 9 is an information provision method for use in the glasses-type terminal, according to a second embodiment of the present invention.

FIG. 9 is an information provision method for use in the glasses-type terminal, according to a second embodiment of the present invention;

First, the controller 180 determines whether the object recognition mode (for example, the business card mode) is activated (S21). For example, when the business card of the user (the user's own) that is registered in advance is recognized through the camera 121, the controller 180 automatically activates the business card mode. The controller 180 periodically searches for a schedule through the schedule management program. When as a result of searching for the schedule, it is found that a predetermined schedule will occur after a predetermined time (for example, 10 to 20 minutes) elapses (for example, 20 minutes before an appointment), the controller 180 may automatically activate the business card mode. When a predetermined voice (for example, "business card," "business recognition," and the like) is recognized, the controller 180 may activate the business card mode. When the business card mode is selected by the user from the menu on the display unit 151, the controller 180 may activate the business card mode.

When the business card mode is activated, the controller 180 controls the camera 121 in such a manner that the camera 121 photographs a photographic subject in real time and detects a business card from the photographed photographic subject. For example, when the business card mode is activated, the controller 180 detects the business card in real time through the object recognition program from an image that is captured in real time through the camera 121. The controller 180 may recognize the business card, based on a type of business card and a text (for example, a name, a telephone number, an address, or the like), which are predetermined, within the image that is captured in real time through the camera 121.

When the business card is detected through the camera 121, the controller 180 recognizes information (business card information) that is described on the detected business card (S22), and displays the recognized information (the business card information) 6-1 on the display unit 151 for a predetermined time (for example, 3 seconds). The predetermined time (for example, 3 seconds) may be changed by the user. For example, the controller 180 compares the recognized business card information 6-1 with a business card list that is stored in advance in the storage unit (the memory) 160, and when as a result of the comparison, the recognized business card information 6-1 is not present on the business card list that is stored in advance, may append the recognized business card information 6-1 to the business card list in the storage unit (the memory) 160. On the other hand, the controller 180 may compare the recognized business card information 6-1 with the business card list that is stored in advance in the storage unit (the memory) 160, and when as the result of the comparison, the recognized business card information 6-1 is present on the business card list that is stored in advance, may automatically delete the recognized business card information 6-1 and at the same time may display on the display unit 151 the alerting information that alerts the user that the recognized business card information 6-1 is present on the business card list that is stored in advance.

When storing the recognized business card information 6-1 in the storage unit (the memory) 160, the controller 180 may store together in the storage unit 160 information on a date on which the business card information 6-1 is recognized and information on a place at which the business card information 6-1 is recognized. When storing the recognized business card information 6-1 in the storage unit (the memory) 160, along with the information on a date on which the business card information 6-1 is recognized and the information on a place at which the business card information 6-1 is recognized, the controller 180 may store in the storage unit 160 voices that are generated during a period of time from the point in time at which the business card information 6-1 is detected to the point in time at which the business card information 6-1 is stored.

When the business card is detected through the camera 121, the controller 180 stores in the storage unit (the memory) 160 an image that is captured through the camera 121 for a predetermined time (for example, 10 seconds) starting from a starting point in time at which the business card is detected (S23). When the business card is detected through the camera 121, the controller 180 may store in the storage unit (the memory) 160 the image that is captured through the camera 121 for 10 seconds (a predetermined time) before the starting point in time at which the business card is detected, and for 10 seconds (a predetermined time) after the starting point in time at which the business card is detected. The predetermined time (for example, 10 seconds) may be changed by the user.

The controller 180 recognizes a face (for example, a second object associated with a first object, such as a business card, a building, a product, or the like) associated with the business card (for example, the first object, such as the business card, the building, the product, or the like), through the face recognition program, from the image that is stored in the storage unit (the memory) 160 for a predetermined time (for example, 10 seconds) starting from a point in time at which the business card 6-1 is detected (S24).

The controller 180 determines whether the number of the recognized faces is two or greater (S25). For example, the controller 180 determines whether the number of the faces is 1, or 2 or greater which are recognized from the image that is stored in the storage unit (the memory) 160 for a predetermined time (for example, 10 seconds) starting from the point in time at which the business card 6-1 is detected.

When the number of the recognized faces is 2 or greater, the controller 180 displays the two or greater faces on the display unit 151, and when any one displayed face is selected by the user from among the displayed two or greater faces (S26), stores the selected face in the storage unit 160 along with the recognized business card information 6-1 (S27).

Figure 10:
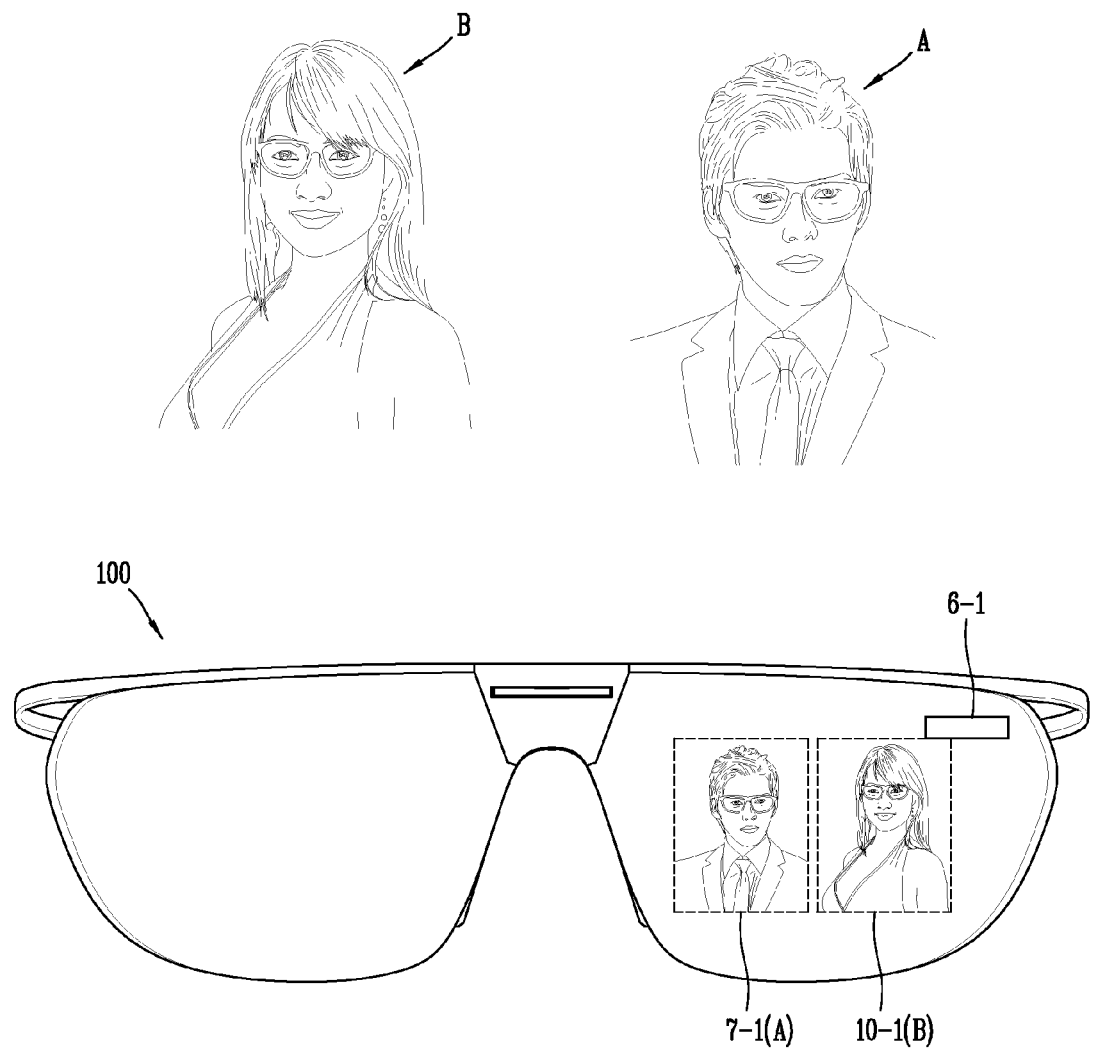
FIG. 10 is a diagram illustrating a process of selecting a face according to a second embodiment of the present invention.

FIG. 10 is a diagram illustrating a process of selecting a face according to a second embodiment of the present invention.

As illustrated in FIG. 10, when the number of the recognized faces is 2 or greater, the controller 180 displays the two or greater faces 7-1(A) and 10-1(B) on the display unit 151, and when any one displayed face (for example, the face 7-1(A)) is selected by the user from among the displayed two or greater faces 7-1(A) and 10-1(B), stores the selected face (for example, the face 7-1(A) in the storage unit 160 along with the recognized business card information 6-1.

When a one face is recognized, through the face recognition program, from the image that is stored in the storage unit (the memory) 160 for a predetermined time (for example, 10 seconds) starting from the point in time at which the business card 6-1 is detected, the controller 180 recognizes one such face as the face of someone A, and along with the recognized information (the business card) 6-1, stores the recognized face 7-1 in the storage unit 160 (S28).

When the multiple recognized business cards and the multiple recognized faces are present, the controller 180 displays any one of the multiple pieces of recognized business card information and the multiple recognized faces on the display unit 151, and when any one recognized face is selected from among the multiple recognized faces, stores the selected face and the any one piece of recognized business information, as one business card, in the storage unit 160. When the multiple recognized business cards and the multiple recognized faces are present, the controller 180 displays any one of the multiple recognized faces and the multiple pieces of recognized business card information on the display unit 151, and when any one piece of recognized business card information is selected from among the multiple recognized business card information, stores the selected business card information and the any one recognized face, as one business card, in the storage unit 160.

When multiple faces are present in the image that is stored in the storage unit (the memory) 160 for a predetermined time starting from a point in time at which the business card is detected, an information provision device for the glasses-type terminal, according to a second embodiment and an information provision method can select and register the face corresponding to the business card information speedily, easily.

Figure 11:
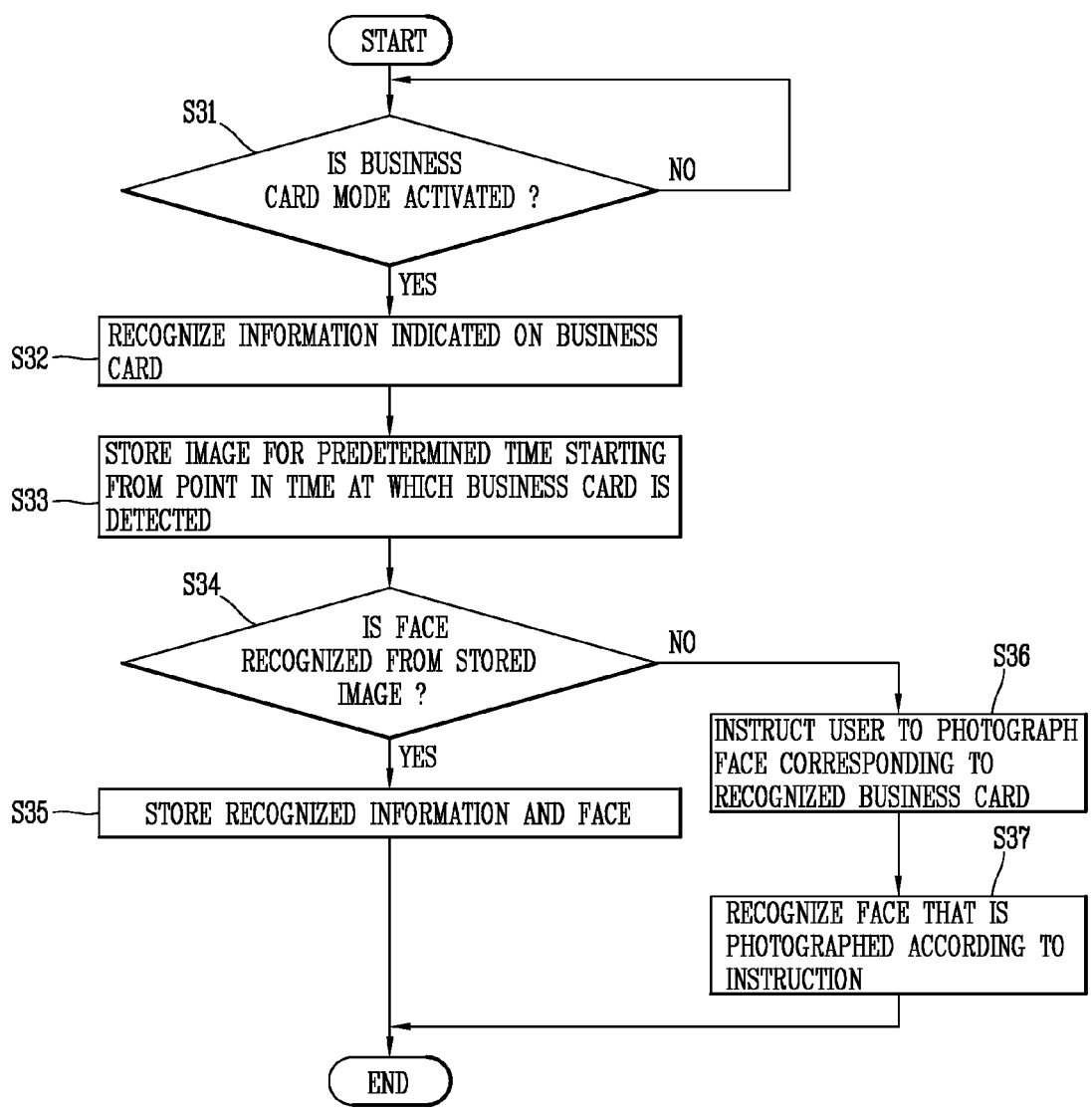
FIG. 11 is an information provision method for use in the glasses-type terminal, according to a third embodiment of the present invention.

FIG. 11 is an information provision method for use in the glasses-type terminal, according to a third embodiment of the present invention.

First, the controller 180 determines whether the business card is activated (S31). For example, when the business card of the user (the user's own) that is registered in advance is recognized through the camera 121, the controller 180 automatically activates the business card mode. The controller 180 periodically searches for a schedule through the schedule management program. When as a result of searching for the schedule, it is found that a predetermined schedule will occur after a predetermined time (for example, 10 to 20 minutes) elapses (for example, 20 minutes before an appointment), the controller 180 may automatically activate the business card mode. When a predetermined voice (for example, "business card," "business recognition," and the like) is recognized, the controller 180 may activate the business card mode. When the business card mode is selected by the user from the menu on the display unit 151, the controller 180 may activate the business card mode.

When the business card mode is activated, the controller 180 controls the camera 121 in such a manner that the camera 121 photographs a photographic subject in real time and detects a business card from the photographed photographic subject. For example, when the business card mode is activated, the controller 180 detects the business card in real time through the object recognition program from an image that is captured in real time through the camera 121. The controller 180 may recognize the business card, based on a type of business card and a text (for example, a name, a telephone number, an address, or the like), which are predetermined, within the image that is captured in real time through the camera 121.

When the business card is detected through the camera 121, the controller 180 recognizes information (business card information) that is described on the detected business card (S32), and displays the recognized information (the business card information) 6-1 on the display unit 151 for a predetermined time (for example, 3 seconds). The predetermined time (for example, 3 seconds) may be changed by the user. For example, the controller 180 compares the recognized business card information 6-1 with a business card list that is stored in advance in the storage unit (the memory) 160, and when as a result of the comparison, the recognized business card information 6-1 is not present on the business card list that is stored in advance, may append the recognized business card information 6-1 to the business card list in the storage unit (the memory) 160. On the other hand, the controller 180 may compare the recognized business card information 6-1 with the business card list that is stored in advance in the storage unit (the memory) 160, and when as the result of the comparison, the recognized business card information 6-1 is present on the business card list that is stored in advance, may automatically delete the recognized business card information 6-1 and at the same time may display on the display unit 151 the alerting information that alerts the user that the recognized business card information 6-1 is present on the business card list that is stored in advance.

When storing the recognized business card information 6-1 in the storage unit (the memory) 160, the controller 180 may store together in the storage unit 160 information on a date on which the business card information 6-1 is recognized and information on a place at which the business card information 6-1 is recognized. When storing the recognized business card information 6-1 in the storage unit (the memory) 160, along with the information on a date on which the business card information 6-1 is recognized and the information on a place at which the business card information 6-1 is recognized, the controller 180 may store in the storage unit 160 voices that are generated during a period of time from the point in time at which the business card information 6-1 is detected to the point in time at which the business card information is stored.

When the business card is detected through the camera 121, the controller 180 stores in the storage unit (the memory) 160 an image that is captured through the camera 121 for a predetermined time (for example, 10 seconds) starting from a starting point in time at which the business card is detected (S33). When the business card is detected through the camera 121, the controller 180 may store in the storage unit (the memory) 160 the image that is captured through the camera 121 for 10 seconds (a predetermined time) before the starting point in time at which the business card is detected, and for 10 seconds (a predetermined time) after the starting point in time at which the business card is detected. The predetermined time (for example, 10 seconds) may be changed by the user.

For example, the controller 180 recognizes a face through the face recognition program from the image that is stored in the storage unit (the memory) 160 for a predetermined time (for example, 10 seconds) starting from the point in time at which the business card 6-1 is detected.

When the face is recognized from the image that is stored in the storage unit (the memory) 160, the controller 180 stores the recognized face 7-1 in the storage unit 160 along with the recognized business card information 6-1 (S35).

For example, when the face is not recognized from the image that is stored in the storage unit (the memory) 160 for a predetermined time (for example, 10 seconds) starting from the point in time at which the business card 6-1 is detected (when the face recognition fails), the controller 180 outputs instruction information that instructs the user to photograph a face corresponding to the recognized business card information (S36). For example, when the face is not recognized from the image that is stored in the storage unit (the memory) 160 for a predetermined time (for example, 10 seconds) starting from the point in time at which the business card 6-1 is detected (when the face recognition fails), the controller 180 generates the instruction information (for example "Take a look at an owner of the business card one more time") that instructs the user to photograph a face corresponding to the recognized business card information and displays the generated instruction information on the display unit 151. When the face is not recognized from the image that is stored in the storage unit (the memory) 160 for a predetermined time (for example, 10 seconds) starting from the point in time at which the business card 6-1 is detected (when the face recognition fails), the controller 180 may generate the instruction information (for example "Take a look at an owner of the business card one more time") that instructs the user to photograph a face corresponding to the recognized business card information and may output the generated instruction information in a voice format through the audio output module 152.

Figure 12:
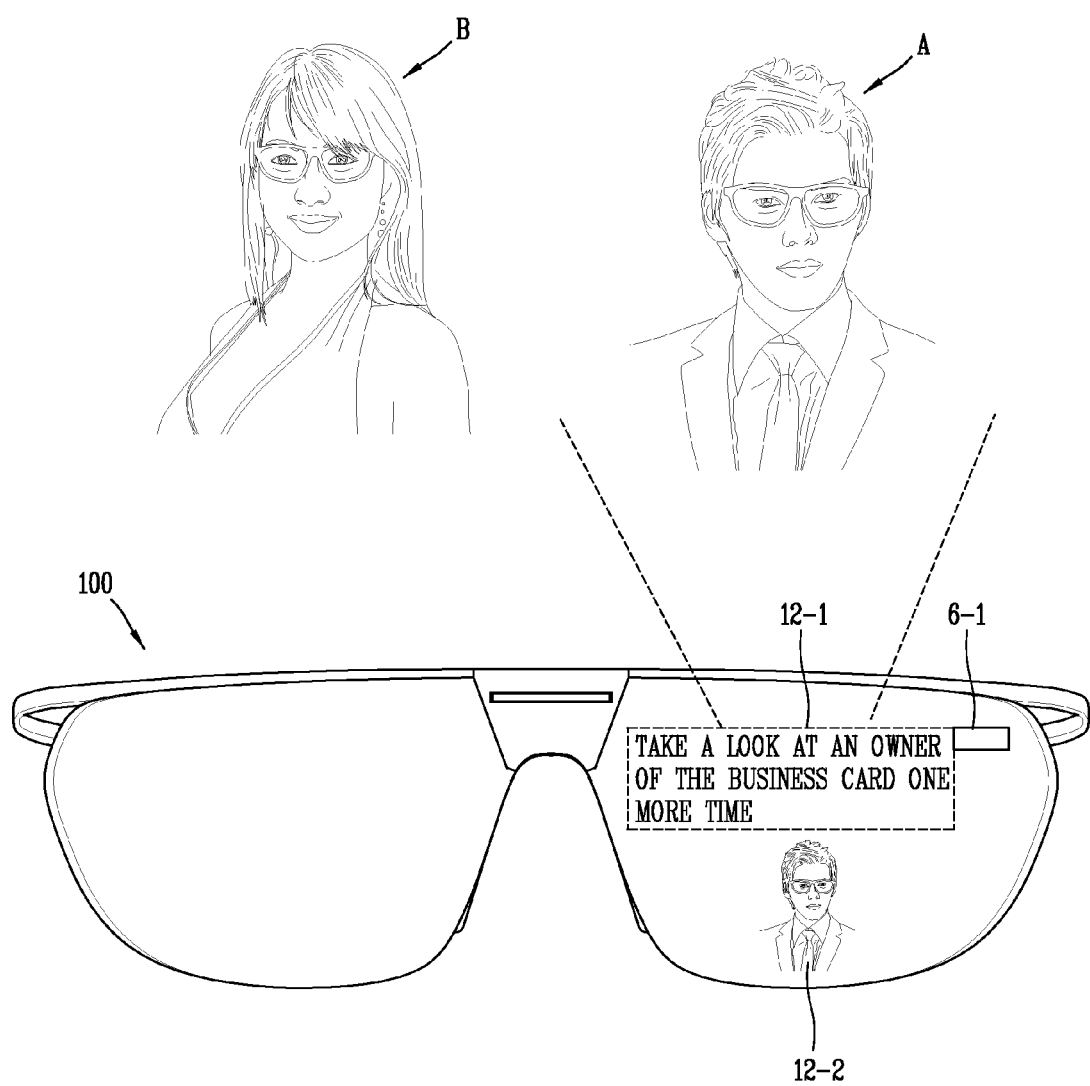
FIG. 12 is a diagram illustrating instruction information according to a third embodiment of the present invention.

FIG. 12 is a diagram illustrating instruction information according to a third embodiment of the present invention.

As illustrated in FIG. 12, when the face is not recognized from the image that is stored in the storage unit (the memory) 160 for a predetermined time (for example, 10 seconds) starting from the point in time at which the business card 6-1 is detected (when the face recognition fails), the controller 180 generates the instruction information (for example "Take a look at an owner of the business card one more time" 12-1) that instructs the user to again photograph a face corresponding to the recognized business card information and displays the generated instruction information 12-1 on the display unit 151.

The controller 180 controls the camera 121 in such a manner that the camera 121 automatically photographs a photographic subject for a predetermined time (for example, 3 to 5 seconds) starting from a point in time at which the instruction information 12-1 is displayed on the display unit 151 and recognizes a face 12-2 from the photographed photographic subject (S37). Then the controller 180 displays the recognized face 12-2 on the display unit 151 and stores the recognized face 12-2 in the storage unit 160 along with the recognized business card information 6-1. When a predetermined voice, the instruction information 12-1 corresponding to which is displayed on the display unit 151, is received or a specific button is pushed down, the controller 180 may photograph a photographic subject for a predetermined time (for example, 3 to 5 seconds) starting from a point in time at which the predetermined voice is received or the specific button is pushed down, and may recognize the face 12-2 from the photographed photographic subject.

When the face is not recognized from the photographic subject that is photographed according to the instruction information 12-1, the controller 180 may inactivate the business card mode and at the same time, may display on the display unit 151 the alerting information indicating that the face is not recognized.

Therefore, the information provision device for the glasses-type terminal, according to the third embodiment of the present invention, and the information provision method can register (store) the business card information and the face corresponding to the business card information together by instructing the user to again photograph the face corresponding the business card information.

As described above, the information provision device for the glasses-type terminal, according to the embodiments of the present invention, and the information provision method for use in the glasses-type terminal can not only activate the business card mode easily, speedily, but also register (store) someone's desired business card and desired face easily, speedily.

When multiple faces are present in the image that is stored in the storage unit (the memory) 160 for a predetermined time starting from the point in time at which the business card is detected, the information provision device for the glasses-type terminal, according to the embodiments and the information provision method can select and register the face corresponding to the business card information speedily, easily.

The information provision device for the glasses-type terminal, according to the embodiments of the present invention, and the information provision method can register (store) the business card information and the face corresponding to the business card information together by instructing the user to again photograph the face corresponding the business card information.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A glasses-type terminal comprising:
a main body comprising one or more frames;
a camera disposed on the one or more frames;
a memory;
a display disposed on the one or more frames; and
a controller configured to:
activate the camera and cause the camera to capture one or more images;
repeatedly attempt detection of a business card image in the captured one or more images after a preset business card stored in the memory is recognized in the captured one or more images;
recognize information included in a detected business card image;
detect a first object in a captured image during a predetermined time period after the business card image is detected;
store the recognized information and an image of the first object in the memory when the first object is determined to be associated with the recognized information;
cause the display to display instruction information for photographing another object corresponding to the recognized information when the first object is determined not to be associated with the recognized information; and
stop repeatedly attempting detection of a business card image when a business card image is not recognized for a threshold length of time after the preset business card is recognized,
wherein the camera is remains activated during the period of repeatedly attempting detection of a business card image and detecting the first object.

2. The glasses-type terminal of claim 1, wherein the controller is further configured to:
cause the camera to repeatedly capture images; and
repeatedly attempt detection of a business card image in one of the repeatedly captured images.

3. The glasses-type terminal of claim 2, wherein the controller is further configured to initiate repeatedly attempting detection of a business card image in the captured one or more images when:
an upcoming event is scheduled to occur within a threshold period of time;
a voice command is recognized; or
a menu option is selected from a menu displayed on the display.

4. The glasses-type terminal of claim 1, wherein the controller is further configured to store the recognized information in an object list stored in the memory when the recognized information is not already stored in the object list.

5. The glasses-type terminal of claim 4, wherein the controller is further configured to:
discard the recognized information when the recognized information is already stored in the object list; and cause the display to display an alert indicating that the recognized information is already stored in the object list.

6. The glasses-type terminal of claim 1, wherein the controller is further configured to store date information and location information related to capture information of the one or more images comprising the business card image, such that the stored date information and stored location information are associated with the stored image and the stored recognized information.

7. The glasses-type terminal of claim 1, further comprising a microphone, wherein the controller is further configured to store audio information captured by the microphone after the one or more images are captured and until the recognized information is stored.

8. The glasses-type terminal of claim 1, wherein:
the one or more images further comprises at least a second object; and
the business card image is selected from the one or more images to store the recognized information included in the business card image.

9. The glasses-type terminal of claim 1, wherein:
the one or more images further comprises at least a second object associated with the recognized information; and
the first object is selected from the image of the one or more images to be stored.

10. The glasses-type terminal of claim 1, wherein the controller is further configured to activate the camera to repetitively capture additional one or more images after the instruction information is displayed.

11. A method for controlling a glasses-type terminal, the method comprising:
activating a camera of the terminal;
capturing one or more images via the camera;
repeatedly attempting detection of a business card image in the captured one or more images after a preset business card stored in the memory is recognized in the captured one or more images;
recognizing information included in a detected business card image;
detecting a first object in a captured image during a predetermined time period after the business card image is detected;
recognizing information included with the first object;
storing the recognized information and an image of the first object in a memory when the first object is determined to be associated with the recognized information;
display instruction information for photographing another object corresponding to the recognized information when the first object is determined not to be associated with the recognized information; and
stopping repeatedly attempting detection of a business card image when a business card image is not recognized for a threshold length of time after the preset business card is recognized,
wherein the camera remains activated during the period of repeatedly attempting detection of a business card image and detecting the object.

12. The method of claim 11, further comprising initiating repeatedly attempting detection of a business card image in the captured one or more images in response to:
detecting an upcoming event scheduled to occur within a threshold period of time;
recognizing a voice command; or
selecting a menu option in response to receiving a selection on a displayed menu.

13. The method of claim 11, further comprising storing the recognized information in an object list stored in the memory when the recognized information is not already stored in the object list.

14. The method of claim 11, further comprising storing date information and location information related to capture information of the one or more images comprising the business card image such that the stored date information and stored location information are associated with the stored image and the stored recognized information.

15. The method of claim 11, further comprising storing audio information captured by a microphone of the glasses-type terminal after the one or more images are captured and until the recognized information is stored.

16. The method of claim 11, wherein the one or more images further comprises at least a second object; and
the business card image is selected from the one or more images to store the recognized information included in the business card image.

17. The method of claim 11, wherein the one or more images further comprises at least a second object associated with the recognized information; the method further comprising receiving an input selecting the first object from the image of the one or more images to be stored.

* * * * *